US008857646B1

(12) United States Patent
Blue

(10) Patent No.: US 8,857,646 B1
(45) Date of Patent: *Oct. 14, 2014

(54) FILTER HOUSING WITH LIFTABLE LID

(71) Applicant: Mark Blue, Fremont, IN (US)

(72) Inventor: Mark Blue, Fremont, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/021,920

(22) Filed: Sep. 9, 2013

Related U.S. Application Data

(63) Continuation-in-part of application No. 13/303,950, filed on Nov. 23, 2011, now Pat. No. 8,540,101.

(51) Int. Cl.
*B65D 43/26* (2006.01)
*B01D 35/30* (2006.01)

(52) U.S. Cl.
CPC ..................................... *B01D 35/30* (2013.01)
USPC ............................ 220/263; 220/816; 220/324

(58) Field of Classification Search
USPC ......... 220/260, 319–321, 293, 300, 582, 324, 220/327, 328, 325, 291, 816, 323, 823, 288, 220/756, 262–264; 248/147, 134
See application file for complete search history.

(56) References Cited

U.S. PATENT DOCUMENTS

| 2,237,528 | A | 4/1941 | Marasso |
| 2,665,868 | A | 1/1954 | Schmidt |
| 2,870,934 | A | 1/1959 | Hill |
| 3,347,507 | A | 10/1967 | Dyer |
| 4,165,013 | A | 8/1979 | Lutz |
| 5,143,389 | A | 9/1992 | Jonkers |
| 6,085,935 | A | 7/2000 | Harris |
| 6,401,958 | B1 | 6/2002 | Foss et al. |

*Primary Examiner* — Andrew Perreault
(74) *Attorney, Agent, or Firm* — Botkin & Hall, LLP

(57) ABSTRACT

A filter housing having a lid that is mateable with a vessel portion. An arm that is rotationally fixed relative to the housing having threads that mate with threads in a ratcheting mechanism. Rotating the ratcheting mechanism raises the lid because the ratcheting mechanism is fixed from longitudinal movement. A slot in which a pin rides is used to fix rotation, the slot has an aligned portion and an angled portion. The aligned portion is aligned with the longitudinal axis of the arm and the angled portion is angled with respect to the longitudinal axis of the arm. As the arm raises and the pin rides in the aligned portion of the slot, the lid raises without rotation, and as the pin rides in the angled portion the lid raises and rotates.

4 Claims, 5 Drawing Sheets

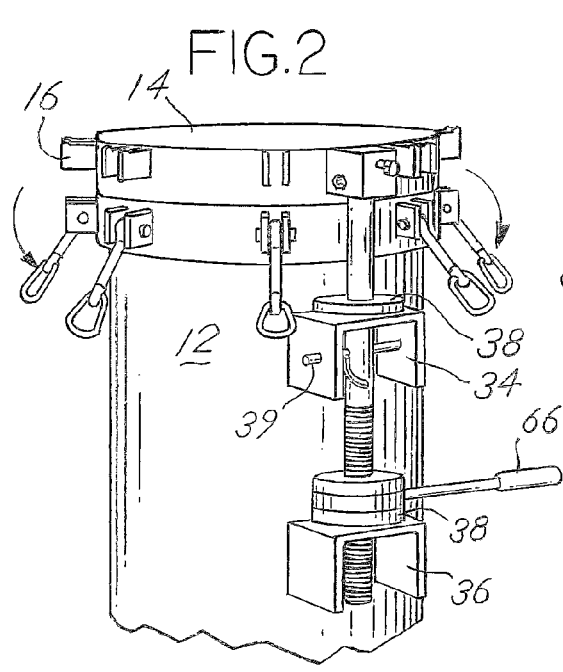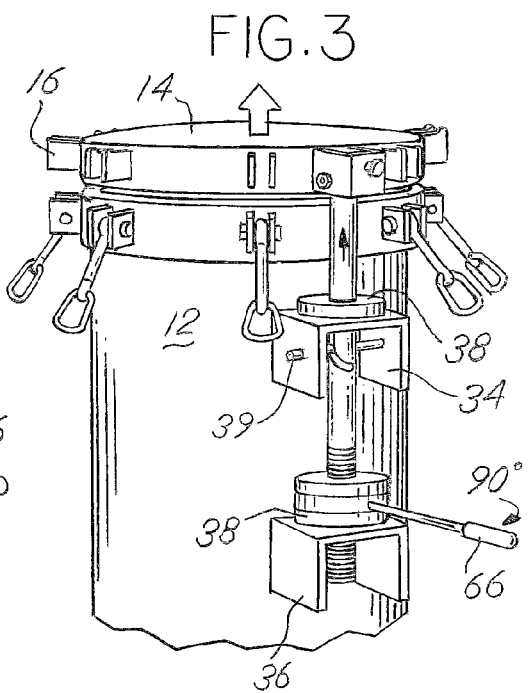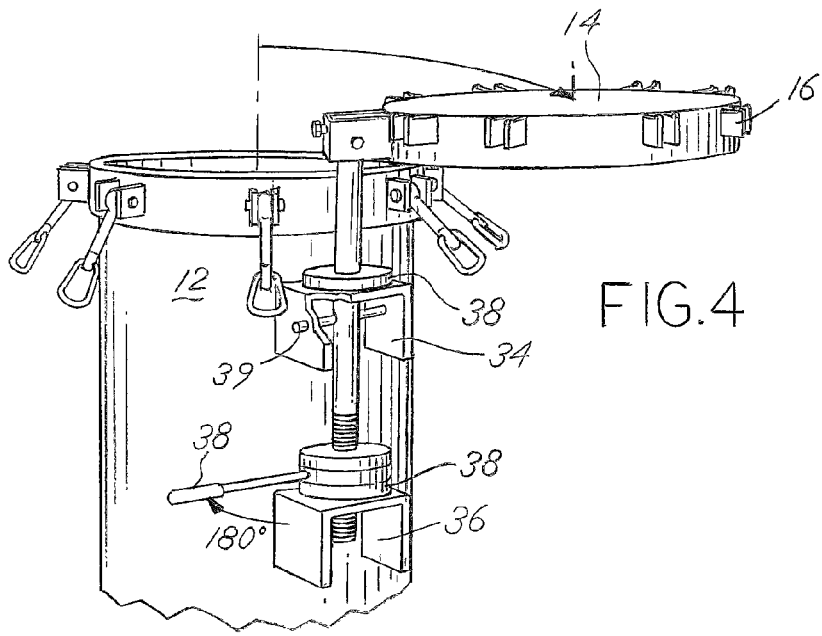

FILTER HOUSING WITH LIFTABLE LID

CROSS REFERENCE TO RELATED APPLICATIONS

This application claims the benefit of U.S. Utility application Ser. No. 13/303,950, filed Nov. 23, 2011, the disclosure of which is hereby incorporated by reference.

BACKGROUND

Large volume filtration vessels are very useful for filtering large amounts of fluid and, due to high pressures within such a vessel, the parts can be quite heavy. The heft of the parts can make changing individual filter elements within the vessel very difficult. Often, a lid or other cover must be lifted to reveal the individual elements within a filter vessel. The cover may be hundreds of pounds and, due to size, be quite awkward. Some large filter vessels may employ external means to lift the cover from the vessel such as an external crane. Frequently chains are used to attach a crane to the lid for lifting. This can cause injury if the chains are improperly installed, or if the chains slip off of the lid during its removal. Ideally, a system for lifting the lid would be integrated into the filter housing itself.

SUMMARY OF THE INVENTION

The present invention relates to a filter housing. The filter housing has a vessel portion and a lid which mates with the vessel portion. An arm is secured to the lid and is movable with respect to the vessel portion. The arm has an inclined feature. A rotational member engages the inclined feature. The rotational member is rotatable with respect to the vessel portion and restrained from longitudinal movement with respect to the vessel portion so that rotation of the rotational member relative to the arm causes longitudinal movement of the arm and separation of the lid from the vessel portion.

In one aspect of the invention, the inclined feature on the arm may be threads. In this case, threads on the rotational member mate with the threads on the arm.

In another aspect of the invention, a slot may be located apart from the threads so that a pin rides in the slot. The slot having an aligned portion that is aligned with respect to the longitudinal axis of the arm, and having an inclined portion that is inclined with respect to the longitudinal axis of the arm. The pin being fixed with respect to the housing so the pin may prevent rotation when in the aligned portion, and facilitate rotation when the pin is in the angled portion.

BRIEF DESCRIPTION OF THE DRAWINGS

FIG. 2 is a perspective view of the filter housing shown in FIG. 1 with the lid in the lowered position;

FIG. 3 is a perspective view of the filter housing shown in FIGS. 1 and 2 with the lid in a raised position, and the lid not being turned with respect to the vessel portion of the housing;

FIG. 4 is a perspective view of the filter housing shown in FIGS. 1-3 with the lid in a raised position, and the lid being turned with respect to the vessel portion of the housing;

DETAILED DESCRIPTION OF INVENTION

Figure 1:
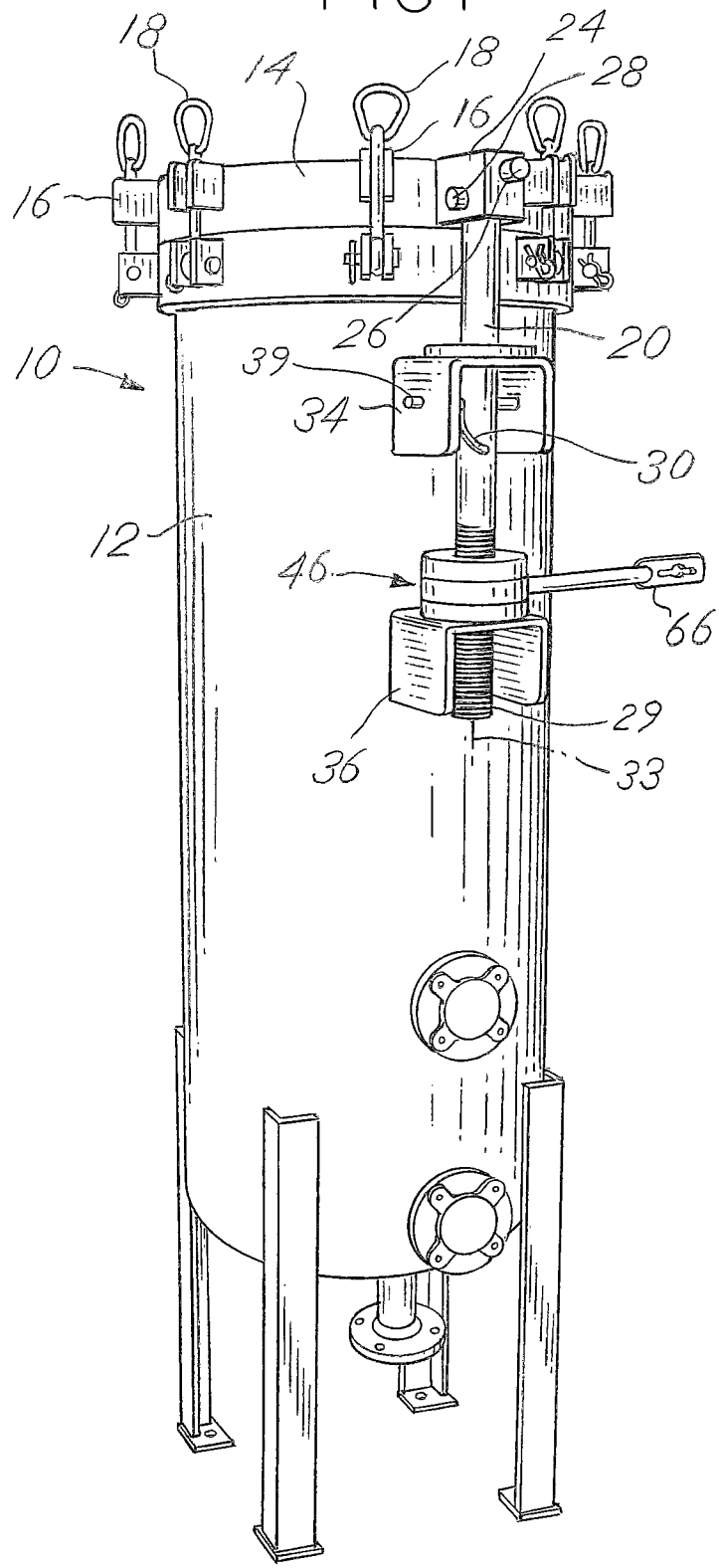
FIG. 1 is a perspective view of the filter housing.

The filter housing 10 of the present invention has a vessel portion 12 and a lid 14 that is sealingly matable to the vessel portion 12. The lid 14 is typically made of steel and, depending on the size of the housing, can be extremely heavy. The lid has retainer brackets 16 around the periphery that are designed to accept clamps 18 that are used to secure the lid 14 to the vessel portion of the housing 10 when it is in use. The lid has an arm 20 that is secured to a mounting bracket 24 on the lid 14. The arm 20 may be joined to the bracket 24 by use of a press fit and bolt 26, or may be mounted with a bolt 26 and/or pin 28. The arm 20 and lid 14 are movable relative to the vessel portion 12 and both move together. The arm 20 is typically made of steel pipe and has an inclined feature which are threads 29 along a threaded portion of the arm 20 near its lower end.

Figure 5:
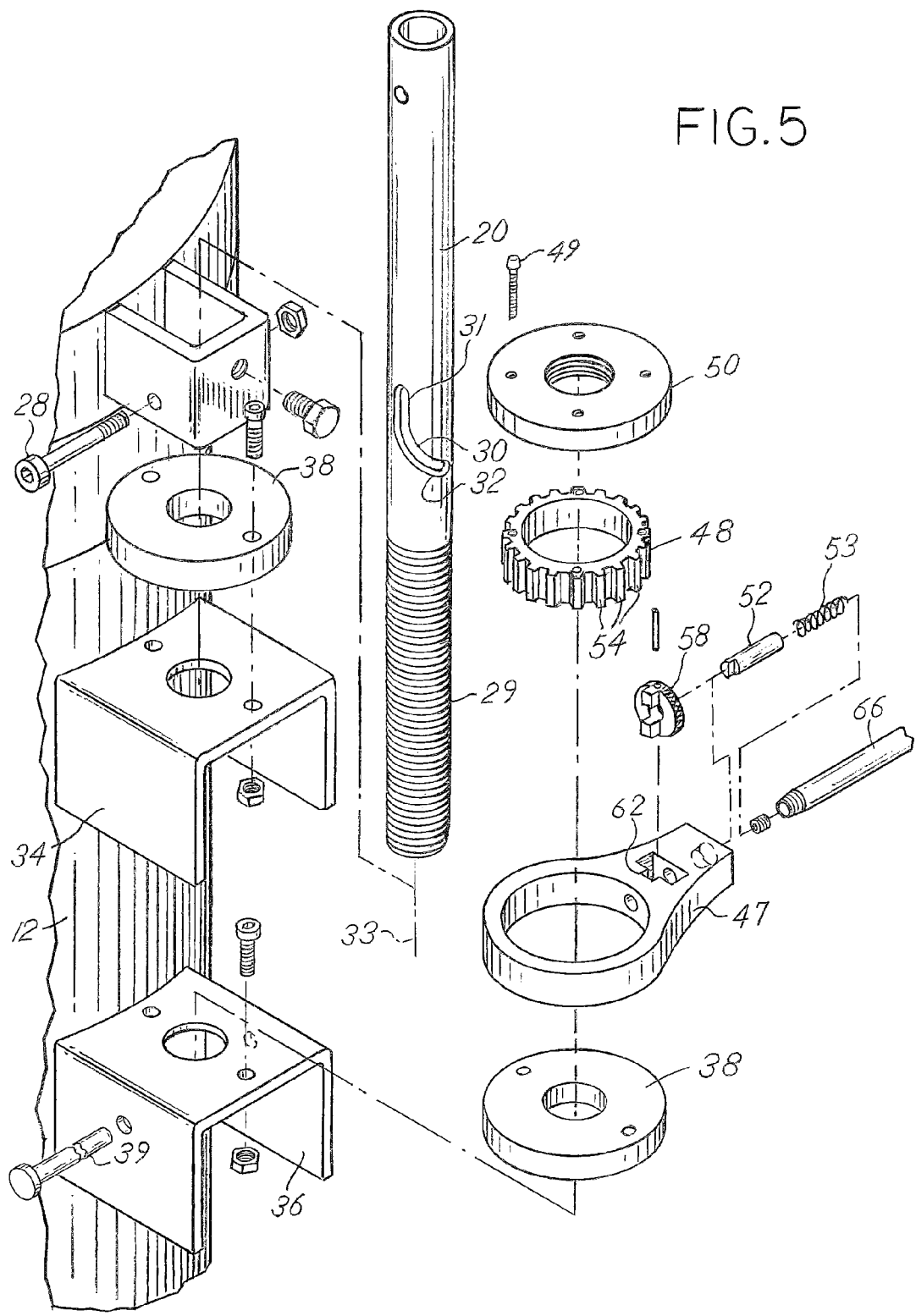
FIG. 5 is an exploded perspective view of the filter housing shown in FIGS. 1-4.
Figure 7:
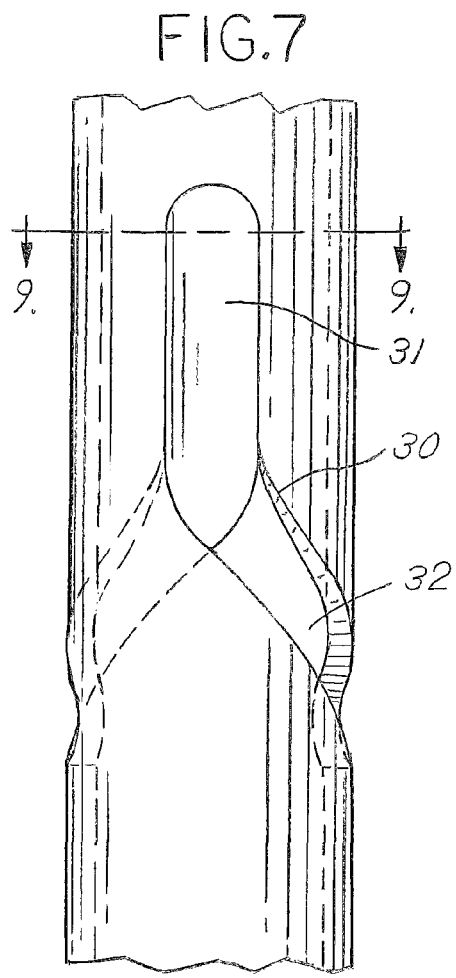
FIG. 7 is a view showing the slot in the arm.
Figure 8:
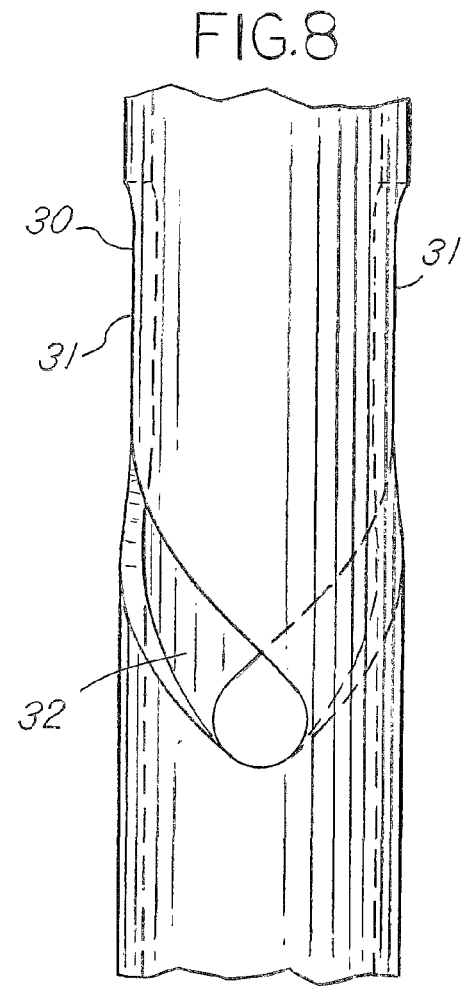
FIG. 8 is side view of the arm shown in FIG. 7 taken ninety degrees to the view shown in FIG. 7.

The arm 20 includes a slot 30 that is above the threads 29. The slot 30 has an aligned portion 31 and an angled portion 32. The aligned portion 31 of the slot 30 is aligned with the longitudinal central axis 33 of the arm 20. The angled portion 32 is inclined with respect to the central axis 33 of the arm 20. The angled portion is helical with respect to the arm 20. As can be seen in FIGS. 5, 7, 8 each side of the arm 20 has a slot and the helical angled portions 32 are oriented so that a pin 39 can extend through the arm 20 at its center through all positions in the aligned and angled portions 31, 32 of the slots 30. The arm 20 is held adjacent to the vessel portion 12 by upper and lower brackets 34, 36. The upper and lower brackets 34, 36 are welded to the side of the vessel portion 20 and have bushings 38 fastened to their upper surfaces as can be seen in FIGS. 1-4. The bushings 38 have an inner diameter that accepts the arm 20 and allows movement of the arm 20 within the bushings 38. Thus, longitudinal and rotational movement of the arm 20 is possible with respect to the vessel portion 12. The upper bracket 34 has holes through which pin 39 is inserted. The pin 39 passes through the upper bracket 34 and through the slot 30. The pin 39 is adapted for riding in the slot 30 during longitudinal movement of the arm 20 with respect to the brackets 34, 36.

Figure 6:
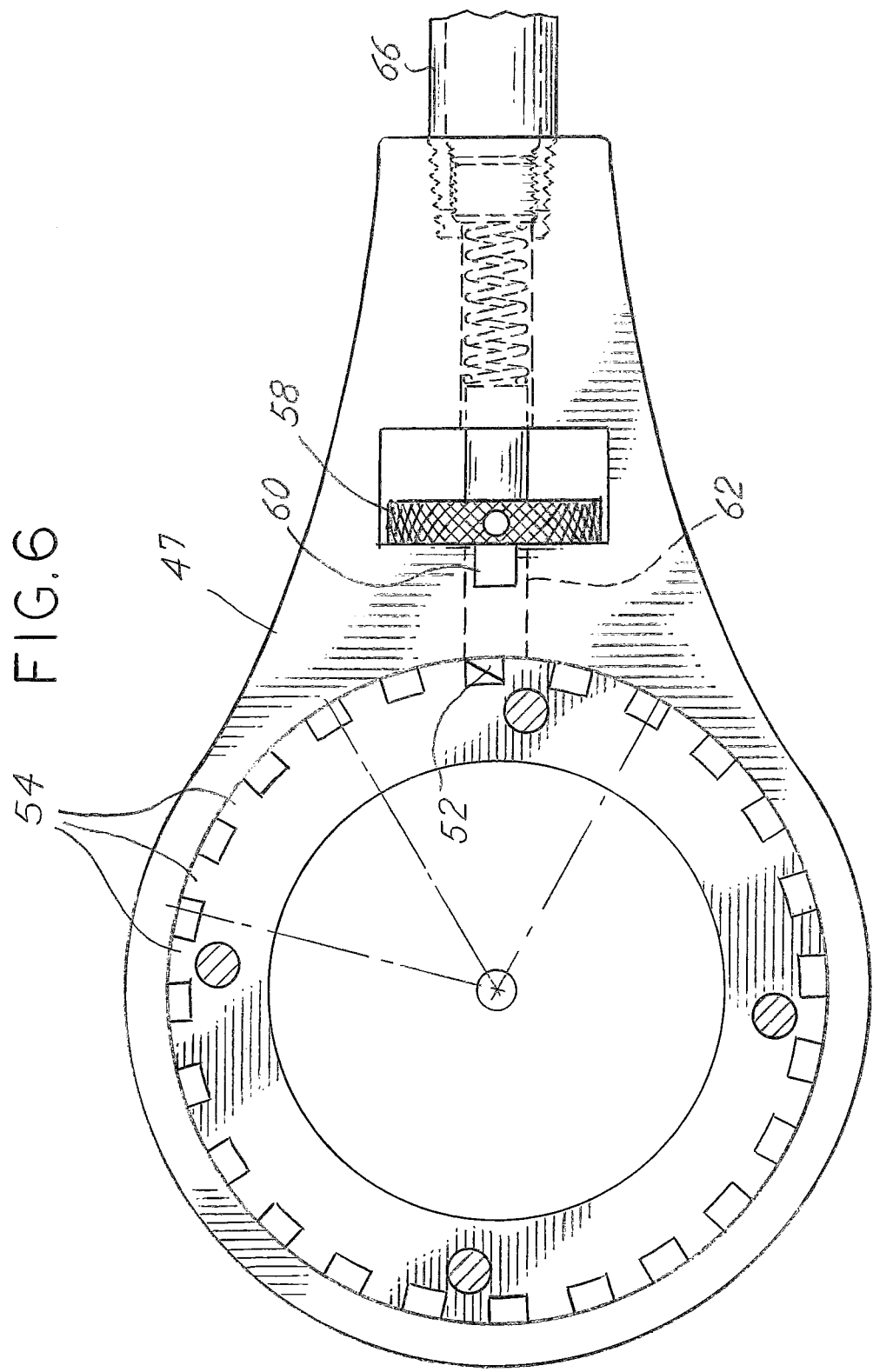
FIG. 6 is a top view of the ratchet housing and ratchet gear.
Figure 9:
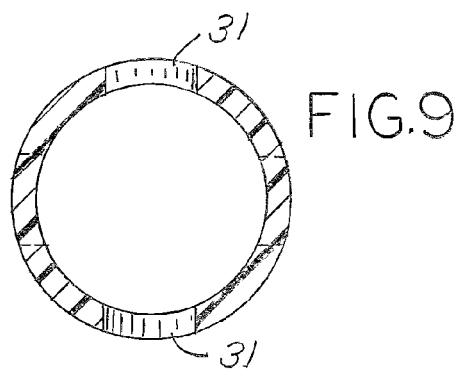
FIG. 9 is a sectional view taken about the line 9-9 in FIG. 7.

A rotational member 46 rests against the bushing 38 on the lower bracket 36, as shown in FIG. 1. The rotational member 46 is fixed from longitudinal movement with respect to the vessel portion 12. The rotational member 46 includes a ratchet housing 47 that contains a ratchet gear 48. The ratchet gear 48 has a threaded bushing 50 that is mounted to the ratchet gear 48 with bolts 49. The threaded bushing 50 has internal threads that match the threads 29 on the arm 20. The connection between the threaded bushing 50 and the threads 29 on the arm 20 supports the weight of the lid 14, and the rotational member 46 is in constant contact with the lower bracket 36. Thus, the rotational member 46 and the threaded bushing 50 are effectively fixed with respect to the vessel portion 12. It is contemplated that it may be possible to put an opposing bracket opposite that of lower bracket 36 to contain the threaded busing 50 and rotational member 46, but due to the weight of the lid 14 this is unnecessary. The ratchet housing 47 includes a reversible spring loaded pawl 52. A spring 53 urges the pawl 52 into teeth 54 on the ratchet gear 48. FIG. 6 shows how the pawl 52 is angled to catch within the teeth 54 in one direction and slide over the teeth 54 in the opposite direction. A knurled thumb wheel 58 is attached to the pawl 52 and has a rib 60 for engaging a notch 62 in the ratchet housing 47. When the wheel is turned 180 degrees, the direction of the pawl 52 is reversed and, as can be seen by one skilled in the art, the direction the ratchet gear 48 will turn will be reversed. A handle 66 extends from the ratchet housing 47.

When the handle 66 is used to turn the ratchet housing 47 with the pawl 52, as shown in FIG. 6, the ratchet gear 48 and threaded bushing 50 will be rotated in a clockwise direction as viewed in FIG. 6. Rotating the ratchet housing 47 in a ratcheting motion will move the entire rotational member 46 downward on the arm 20. Thus, the arm 20 will be urged upward because the rotational member 46 rests against the lower bracket 36 that is fixed to the vessel portion 12. As the arm 20 is urged upward, the pin 39 rides in the slot. When the lid 14 is in its fully lowered position, the pin 39 is in its uppermost position in the aligned portion 31 of the slots 30. This is shown in FIG. 2. As the arm 20 is urged upwardly to the point that the pin 39 is in the angled portion 32 of the slot 30, rotation will be imparted in the arm 20 and therefore the lid. The lid 14 and arm 20 are restrained from rotation for a predetermined distance equivalent to the length of the aligned portion 31 of the slot 30. While the pin 39 is in the aligned portion 31 of the slot, the lid 14 will be lifted vertically. Upon entry of the pin 39, in the angled portion 32 of the slot, the lid will continue to lift, and will rotate at the same time. FIG. 3 shows the lid 14 being lifted to its height just before rotation, the lifted height being the length of the aligned portion 31. FIG. 4 shows the lid 14 being rotated toward the right of FIG. 4. It is contemplated that the angled portion 32 of the slot 30 could be angled the opposite way as that shown in the FIGS, and in such case the lid 14 could be made to rotate in the opposite direction as that shown in FIG. 4. If standard right hand threads 29 are used for the threaded portion of the arm 20, friction will tend to assist in rotation of the lid in the direction shown in FIG. 4 during upward movement of the lid. Likewise, with standard right hand threads 29, friction will tend to assist in rotating the lid the opposite direction during lowering of the lid.

For a user to lower the lid 14, he will first pull back on the knurled thumb wheel 58 and rotate the pawl 52, 180 degrees to the position shown in FIG. 6. This will cause the ratchet gear 48 and threaded bushing 50 to be rotated counterclockwise when the handle 66 is pulled. As mentioned above, friction from the threads will assist in rotating the arm 20 so that the pin 39 moves from the angled portion 32 into the aligned portion 31. Throughout the entire operation of raising and lowering the lid 14, the threaded bushing 50 never leaves contact with the lower bracket 36.

The invention is not limited to the details given above, but may be modified within the scope of the following claims.

What is claimed is:

1. A filter housing comprising:
   a vessel portion;
   a lid being sealingly matable with said vessel portion;
   a pin that is fixed relative to said vessel portion;
   an arm secured to said lid and movably engaged with said vessel portion, said arm including a slot, said pin riding in said slot to restrain said arm from rotational movement said slot including an angled portion being angled with respect to said longitudinal axis, said pin restraining said arm from rotational movement when in said aligned portion and said pin imparting rotation in said arm as said pin rides in said angled portion, said arm including a threaded portion having threads; and
   a rotational member circumscribing said arm and including threads engaging said threads on said arm, said rotational member rotatable with respect to said vessel portion, said rotational member being fixed from longitudinal movement with respect to said vessel portion so that rotation of said rotational member about said arm causes longitudinal movement of said arm and separation of said lid from said vessel portion.

2. The filter housing as claimed in claim 1, wherein said rotational member includes a ratcheting mechanism and said threads are located on a threaded bushing that is held within said rotational member for ratchetable rotation.

3. The filter housing as claimed in claim 2, wherein said ratcheting mechanism includes a gear having teeth affixed to said threaded bushing and a pawl for engaging said teeth.

4. The filter housing as claimed in claim 3, wherein said pawl is reversible.

\* \* \* \* \*